Nov. 26, 1957    P. SPENCE    2,814,311
BALANCED VALVE-ACTUATING MEANS
Filed Oct. 30, 1952

INVENTOR
Paulsen Spence
BY
Mitchell Bechtel
ATTORNEYS

United States Patent Office 2,814,311
Patented Nov. 26, 1957

2,814,311

BALANCED VALVE-ACTUATING MEANS

Paulsen Spence, Baton Rouge, La.

Application October 30, 1952, Serial No. 317,618

1 Claim. (Cl. 137—787)

My invention relates to a float valve or the like, and more particularly to means for transmitting motion from one side of a wall, such as a chamber wall, to the other side thereof when the wall is subjected to different pressures, all without the necessity for the usual high-friction stuffing boxes. This invention is in the nature of an improvement over the structure of my Patent 2,587,401, issued February 26, 1952.

Heretofore, the motion of a float valve or the like has been transmitted through the wall of a float chamber or other vessel by means of a shaft or rod extending through the wall. Such shafts or rods have necessarily passed through stuffing boxes or the like, and, particularly when pressures at the inside and outside of the float chamber were greatly different, the stuffing boxes were so tight that the frictional force on the rod or shaft has precluded free and easy movement. Under the circumstances, it has been difficult to maintain a fluid level within relatively narrow limits.

It is an object of my invention to provide an almost friction-free means for transmitting motion from one side of a wall to another when the wall is subjected to different pressures on opposite sides.

It is another object to provide means for avoiding stuffing boxes or the like in a device of the character indicated.

It is also an object to provide improved details of construction in a float valve or the like.

Figure 1:
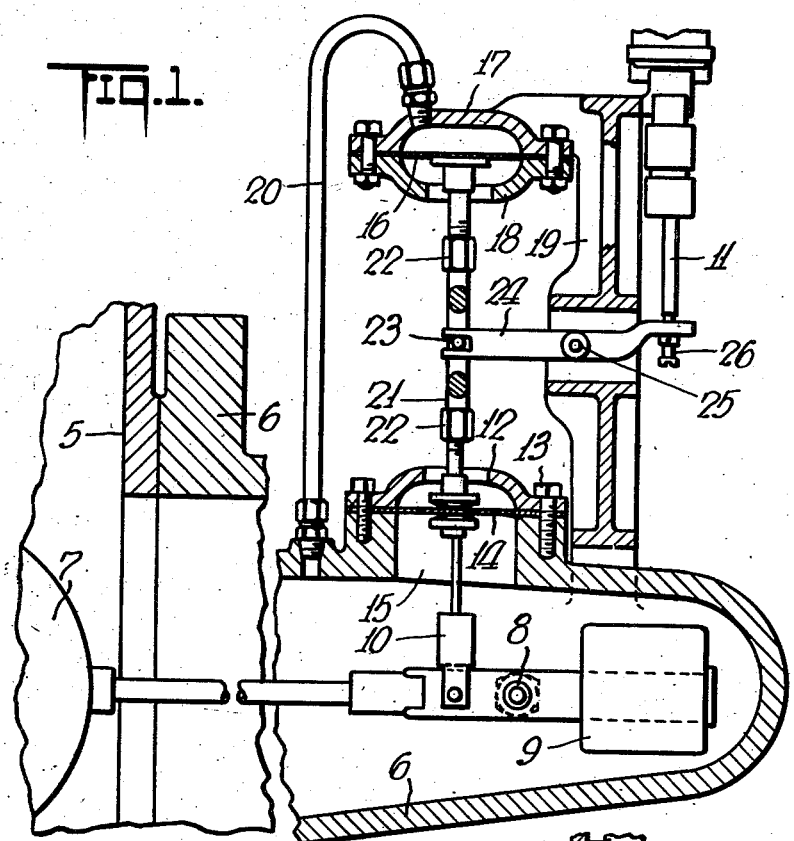
Figure 2:
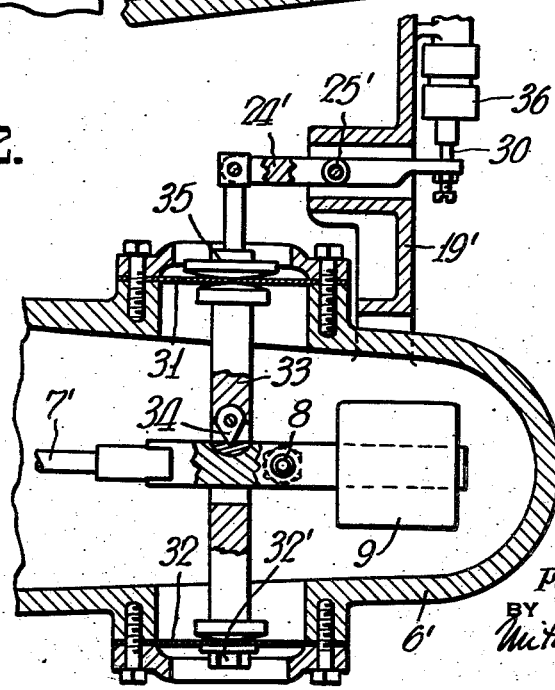

Other objects and various further features of novelty and invention will be set forth or will become apparent to those skilled in the art from a reading of the following specification in conjunction with the accompanying drawings. In said drawings, which show, for illustrative purposes only, preferred forms of the invention:

Fig. 1 is a broken sectional view through a vessel having a float chamber and illustrating the invention; and Fig. 2 is a similar view but illustrating an alternative form.

In the drawings, I indicate a pressure vessel 5, having a float chamber 6 secured thereto. Within the vessel or float chamber is a float 7, and the float arm may be mounted on a pivot 8 within the float chamber, as is usual practice. If desired, a counterweight 9 may be carried by the float arm. The float arm may carry an actuator 10 for imparting the motion of the float arm to an actuated part. The part to be actuated may be any control or switch member and, as shown, is a pilot-valve stem 11 for controlling a valve to maintain a definite fluid level in the vessel 5.

The invention relates particularly to practically frictionless means for transmitting movement of the part 10, on one side of the chamber wall 6, to a control or other member 11 on the opposite side of the wall, when the sides are subjected to different pressures. In the preferred forms shown, I employ diaphragm means, sealed to the chamber wall 6, and serving to seal an opening through the wall 6 in such a way that pressures at the inner and outer sides of the wall will be balanced so that motion imparted to the diaphragm means may be transmitted through a rod or other linkage passing freely through the wall, or at least abutting the diaphragm means for actuation thereby. In order to neutralize pressure-differential effects, I prefer to employ two diaphragms so mounted that pressure at the inside of the wall is freely transmitted to each diaphragm at one side, and so that the pressure prevailing at the other side of the wall is freely transmitted to the other side of the diaphragms. The diaphragms are preferably of the same stiffness and effective area and are so mounted in relation to the wall that the effect of one will substantially counterbalance the effect of the other. Also, the two diaphragms are connected by suitable linkage including a connection to a part to be actuated.

In the form shown in Fig. 1, one of the two diaphragms is sealed directly to the wall of the float chamber 6. I have shown an open hood 12 clamped by bolts 13 to seal diaphragm 14 to an opening 15 in chamber 6. The other diaphragm 16 is shown closing an auxiliary chamber 17, and is clamped in position by another open hood 18 in a manner similar to diaphragm 14. The auxiliary chamber 17 is preferably rigidly supported with respect to the chamber 6, and for this purpose I show a bracket or standard 19 which may be formed as a part of or brazed to the float chamber 6. In order that the auxiliary chamber 17 may be subjected to the same internal pressures as the chamber 6, I provide fluid-communicating means, such as a duct 20, connecting chambers 6—17.

In order that the motion of actuating element 10 may be transmitted externally of chamber 6 independent of pressure differentials across chamber 6, I provide mechanical means differentially connecting the two diaphragms 14—16. In the form shown, such mechanical means is in effect a rod 21 having adjustable means 22, whereby the desired central position of an actuating pin 23 may be selected. Motion of pin 23 may be picked off by means of the forked end of a rocker arm 24 pivoted at 25 in the standard 19. In the form shown, the valve stem 11 is to be actuated, and I show an adjustable means 26 whereby valve actuation may reflect a given float movement.

In the arrangement of Fig. 2, balanced, friction-free movement of the float arm 7' is transmitted externally to a valve stem 30 by means of like diaphragms 31—32 sealed directly to the float-chamber means 6'. Diaphragms 31—32 may be mounted similarly to diaphragm 14 in Fig. 1 and on opposite sides of chamber 6'. I have shown mechanical means 33 connecting the diaphragms and carrying a knife edge 34 for friction-free positioning by arm 7'; at least when internal pressure exceeds external pressure, means 33 is preferably secured to both diaphragms 31—32, as suggested by the bolt head 32' on diaphragm 32. Displacements of means 33 may be picked off externally from either or both diaphragms, as by follower means 35 riding diaphragm 31 and pinned to rocker arm 24'. Arm 24' may be pivoted at 25' to the same standard 19' as is used for mounting the valve 36 to be actuated.

It will be seen that I have disclosed relatively simple but highly effective means for transmitting motion through a chamber wall in spite of pressure differentials across the wall. Pressure-differential effects are completely balanced-out or neutralized, and, at least for the small displacements herein contemplated, no frictional resistance need by encountered in traversing the wall.

While I have described my invention in detail for the preferred forms shown, it will be understood that modifications may be made within the scope of the invention as defined in the claim which follows.

I claim:

In a float valve or the like, chamber means externally exposed to the atmosphere and adapted to sustain internal pressure, said chamber means including side walls having opposed openings therein, and means for transmitting mechanical-displacement motion between the inside and outside of said chamber means, said transmitting means including two diaphragms of equal area and sealed to said chamber means to close off said openings, whereby the inner sides of both diaphragms are sealed for communication only with the pressure within said chamber means, and whereby the outer sides of both diaphragms are sealed for communication only with the atmosphere, said diaphragms being spaced from each other and symmetrically disposed on the same displacement axis, and mechanical displacement means including a rod on said displacement axis and contained within said chamber means and directly abutting both diaphragms, said last-defined means including an externally exposed lever fixedly pivoted with respect to said chamber means and directly following external movement of one of said diaphragms.

References Cited in the file of this patent

UNITED STATES PATENTS

| | | |
|---|---|---|
| 1,796,537 | Rossiter | Mar. 17, 1931 |
| 2,263,252 | Tallman | Nov. 18, 1941 |
| 2,334,977 | Wolfe | Nov. 23, 1943 |
| 2,365,650 | Shaw et al. | Dec. 19, 1944 |
| 2,446,051 | Leslie | July 27, 1948 |
| 2,563,138 | Smith | Aug. 7, 1951 |
| 2,587,401 | Spence | Feb. 26, 1952 |
| 2,636,685 | Clark | Apr. 28, 1953 |

FOREIGN PATENTS

| | | |
|---|---|---|
| 174,116 | Germany | Aug. 4, 1906 |